May 10, 1960 E. L. YOUNKER 2,936,117
HIGH SPEED SWITCHING CIRCUITS EMPLOYING SLOW ACTING COMPONENTS
Filed May 31, 1957 8 Sheets-Sheet 1

INVENTOR
E. L. YOUNKER
BY Alan C. Rose
ATTORNEY

INVENTOR
E. L. YOUNKER
BY Alan C. Rose
ATTORNEY

May 10, 1960 E. L. YOUNKER 2,936,117

HIGH SPEED SWITCHING CIRCUITS EMPLOYING SLOW ACTING COMPONENTS

Filed May 31, 1957 8 Sheets-Sheet 3

INVENTOR
E. L. YOUNKER
BY Alan C. Rose
ATTORNEY

HIGH SPEED SWITCHING CIRCUITS EMPLOYING SLOW ACTING COMPONENTS

Filed May 31, 1957 8 Sheets-Sheet 4

INVENTOR
E. L. YOUNKER
BY Alan C. Rose
ATTORNEY

May 10, 1960 E. L. YOUNKER 2,936,117

HIGH SPEED SWITCHING CIRCUITS EMPLOYING SLOW ACTING COMPONENTS

Filed May 31, 1957 8 Sheets-Sheet 5

INVENTOR
E. L. YOUNKER
BY Alan C. Rose
ATTORNEY

INVENTOR
E. L. YOUNKER
BY Alan C. Rose
ATTORNEY

May 10, 1960 E. L. YOUNKER 2,936,117

HIGH SPEED SWITCHING CIRCUITS EMPLOYING SLOW ACTING COMPONENTS

Filed May 31, 1957 8 Sheets-Sheet 7

INVENTOR
E. L. YOUNKER
BY Alan C. Rose
ATTORNEY

INVENTOR
E. L. YOUNKER
BY Alan C. Rose
ATTORNEY

United States Patent Office 2,936,117 Patented May 10, 1960

2,936,117

HIGH SPEED SWITCHING CIRCUITS EMPLOYING SLOW ACTING COMPONENTS

Elmer L. Younker, Madison, N.J., assignor to Bell Telephone Laboratories, Incorporated, New York, N.Y., a corporation of New York Application May 31, 1957, Serial No. 662,722

12 Claims. (Cl. 235—165)

This invention relates to digital data processing circuits, and more particularly to circuit configurations having increased speed as compared with standard circuits employing the same type of circuit components.

In parallel digital computers, it is customary to perform multiplication by sucessive additions in a group of parallel adders. The output from each adder is stored in a bit register and is shifted and applied to the input of the next adder of the group during successive cycles. Although this mode of operation is satisfactory for many purposes, the time required to sense the output of each bit register and to reset it are limiting factors at higher speeds of operation.

Accordingly, one object of the present invention is to increase the speed of operation of logic circuits including bit registers connected between output and input circuits.

It is a feature of the invention that a high speed logic circuit has two bit registers in storage loops connected between a single output and a single input of the logic circuit, and gating circuits are provided to route successive digital signals alternately to the two bit registers. As applied to the example of multiplication mentioned above, the logic circuit is one of a group of parallel adders and the two bit registers are both connected from the output of each added stage to one input of the next less significant adder stage.

When the normal operating speed of a major component of a data processing system is increased, it is necessary to supply digital information to the computer at a higher rate of speed. Accordingly, it is another object of the invention to originate a train of binary information signals at higher rates of speed than are normally employed in any given data processing technology.

In accordance with a corresponding aspect of the invention, a composite shift register includes a first shift register which processes only the first, third and other odd numbered digits and a second shift register interlaced with said first register which processes only the even digits of a number, and digital information is alternately gated from an odd and an even stage of the composite shift register. Information may also be applied to the composite shift register digit by digit with alternate digits being applied to the odd and even shift registers. It is also contemplated that information may be transferred into and out of the composite shift register in parallel.

It is another feature of the invention that a composite shift register includes an odd register for processing only the odd digits of a number or code group and an even register interlaced with the odd register for processing even digits, and that parallel input and output circuits to the composite shift register are also provided.

It is an additional feature of the invention that an interlaced storage register is connected to an associated high speed data processing circuit, and that switching circuits are provided for transferring information digit by digit between the high speed circuit and the odd and even shift registers, with the odd and even registers being employed alternately for the transfer of successive digits.

Other objects and features, and various advantages of the invention may be readily understood from a consideration of the following detailed description and the accompanying drawing, in which.

Figure 1:
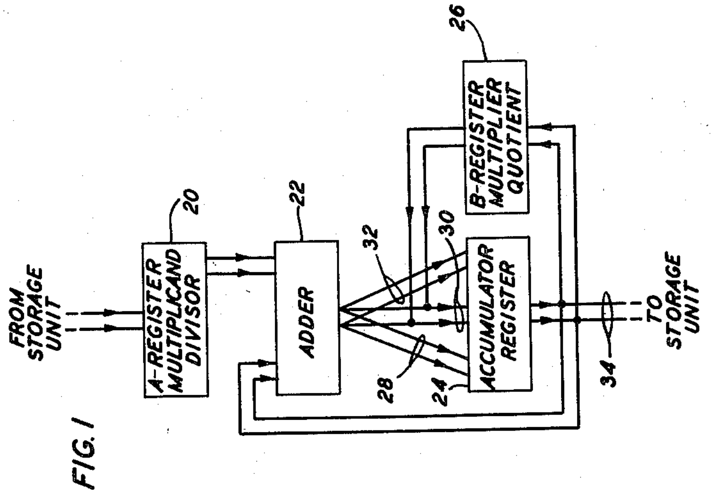
Fig. 1 is a block diagram of a parallel arithmetic unit.

By way of example, the present invention is described in the context of an arithmetic unit which is shown in block diagram form in Fig. 1. In Fig. 1, the double lines interconnecting various components indicate that the numbers may be transferred in parallel. Thus, in the particular system which is employed, numbers including sixteeen binary digits or bits are supplied from a storage unit (not shown) to the A-register 20. Other major components shown in Fig. 1 include the adder 22, the accumulator register 24, and the B-register 26. The three paths 28, 30, and 32 between the adder and the accumulator register are provided for performing different arithmetic operations. Thus, for example, the direct path 30 is employed in addition and subtraction operations, whereas the paths 28 and 32, which indicate a shift of one digit to the left or right, respectively, are employed for multiplication and division. The accumulator register 24 has output circuits to the B-register 26 and to the adder 22. Numbers may be returned to storage only on leads 34 from the accumulator register 24.

The nature of the blocks 20, 22, 24, and 26 of Fig. 1 will be considered in considerable detail at a later point in the present description. Consideration will now be given to one stage of the adder 22 and the associated stage of the accumulator 24. To point up the invention, typical adder and accumulator stages of the prior art will first be considered, and thereafter the circuits in accordance with the present invention will be developed.

Figure 2:
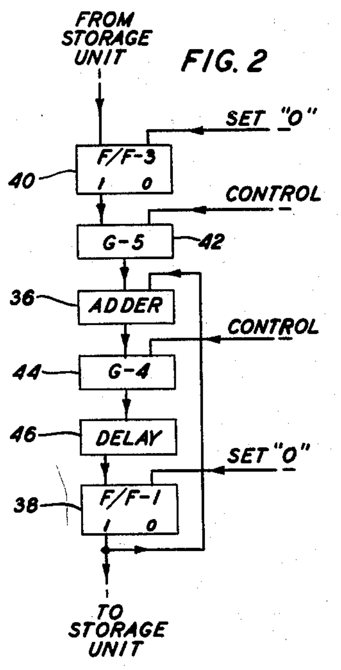
Fig. 2 is a logic diagram of one stage of a parallel adder and associated accumulator register.

Fig. 2 represents one stage of a prior art computer circuit which includes the adder 36 and the accumulator register 38. The circuit of Fig. 2 also includes the flip-flop 40 which corresponds generally to one stage of the A-register of Fig. 1, the gating circuits 42 and 44, and the delay circuit 46. In operation, the adder 36 adds the digit stored in register 40 (part of the addend) to that stored in register 38 (part of the augend) and holds the sum in register 38. Now, the register 38 cannot hold both the sum and the augend digits simultaneously. Therefore, the loop including the adder 36 and the accumulator register 38 must include temporary storage. This is accomplished in Fig. 2 by the delay circuit 46.

Figure 3:
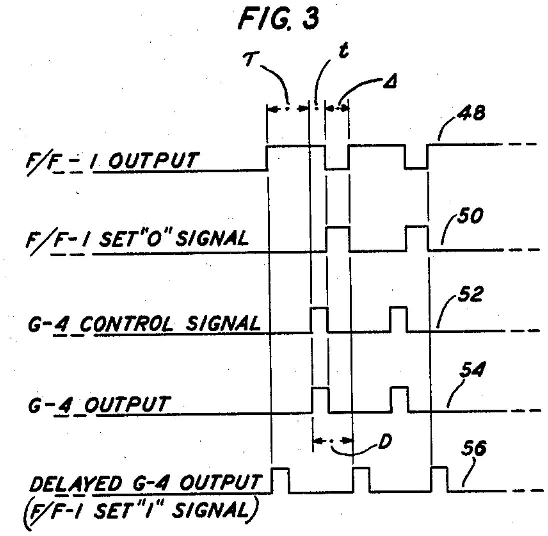
Fig. 3 is a diagram indicating the pulse wave forms at various points in the circuit of Fig. 2.

The wave forms shown in Fig. 3 represent several cycles of operation of the circuit of Fig. 2. Thus, for example, the upper wave form 48 indicates the output of the register 38; the signal for resetting the accumulator register 38 to the "0" state is shown at 50; and the wave forms 52, 54, and 56 indicate the gating signals for controlling the gating circuit 44 and for applying signals to the register 38.

The circuits of Fig. 2 and the plots of Fig. 3 will now be considered in somewhat greater detail to see how fast successive additions can be performed. For this purpose, it is helpful to define some time intervals as follows.

(1) $\Delta$ is the minimum time between the application of a set "0" signal to flip-flop 38 and the following set "1" signal applied to the same flip-flop.

(2) $\tau$ is the minimum time between the application of input signals to the adder 36 and the sensing of the adder output. This corresponds roughly to the carry propagation time of the adder.

(3) $t$ is the minimum width of the pulse required to set flip-flop 1 to the "1" state.

The minimum time between successive sensings of flip-flop 38 is $(\tau+t+\Delta)$ seconds. This follows from the following considerations. First, the adder inputs must last for $\tau$ seconds before the adder output is sensed, and for $t$ seconds after the adder output is produced. Thus, flip-flop 38 must remain in the digit storing condition for $(\tau+t)$ seconds before the reset signal can be applied. Furthermore, $\Delta$ seconds must pass after the beginning of the reset signal before flip-flop 38 can be sensed to begin the next subsequent cycle. It may also be noted that the storage time or delay D which is required is equal to $(\Delta+t)$ seconds. This is indicated in Fig. 3. More specifically, the first plot 48 shows the output of register 38 for the case where the output signal from the adder 36 has set the flip-flop to the "1" state during two consecutive cycles. As may be observed from the plot 48, each cycle lasts for a time period equal to $(\tau+t+\Delta)$ seconds. Since the output of flip-flop 38 must last for $(\tau+t)$ seconds, the reset (or set "0") signal must occur $(\tau+t)$ seconds after the beginning of the pulse at the output of flip-flop 38. Since the set "1" signal to flip-flop 38 must be $t$ seconds long, the gating signal to the circuit 44 must start at $[(\tau+t)-t]=\tau$ seconds after the start of the output pulse from flip-flop 38. In addition, since the output of gate 44 which starts at $\tau$ seconds cannot be applied to flip-flop 38 until $(\tau+t+\Delta)$ seconds after the start of the previous pulse, the output of gate 44 must be delayed by $(t+\Delta)$ seconds; therefore, the delay D of circuit 46 must be equal to $(t+\Delta)$ seconds.

Using this equality, it is seen that the minimum time between sensings of flip-flop 38 is $(\tau+D)$ seconds. As noted above, the quantity $\tau$ depends on the properties of the adder, and the value of D depends on the properties of the accumulator registers or flip-flops. In transistor circuits in which $\tau$ and D are approximately equal, the arithmetic unit speed is strongly dependent on the properties of both the adder and the flip-flop.

In deriving the foregoing timing relationships, it was assumed that register 38 could be set to the "1" state instantly and that its output pulse had an infinitely steep leading edge. Any delay in the operation of flip-flop 38 reduces the time during which its output is applied to the adder 36. To insure the application of the output of flip-flop 38 to adder 36 for the full time $(\tau+t)$ seconds which is required, the flip-flop can be energized for a slightly longer time interval.

Figure 4:
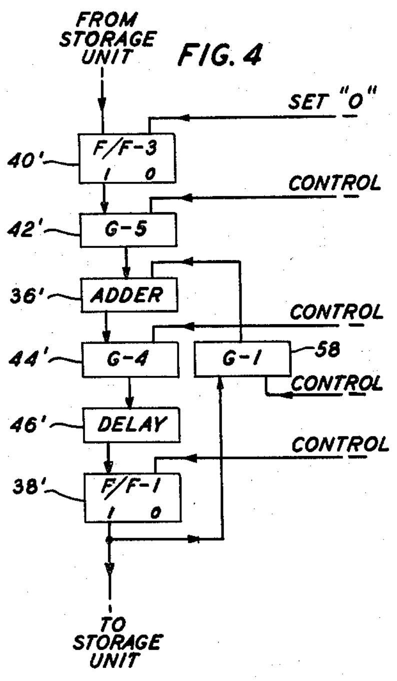
Figs. 4 and 5 are a circuit diagram of a computer circuit which is similar to that of Fig. 2 and a pulse diagram for the circuit of Fig. 4, respectively.
Figure 5:
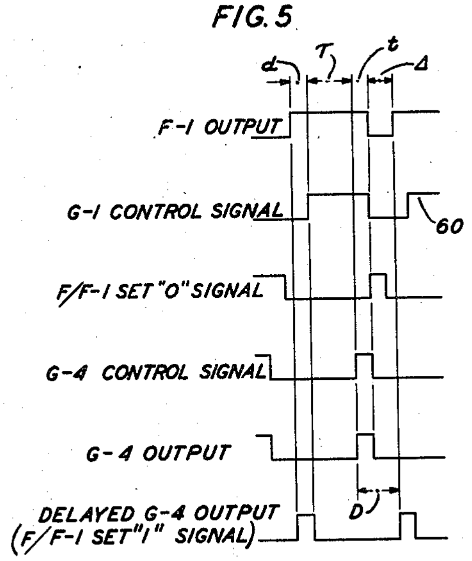

The circuit of Fig. 4 is a substantial duplicate of that of Fig. 2 with the exception that an additional gating circuit 58 is provided. To simplify the comparison of Fig. 4 with Fig. 2, the designations appearing within the blocks of Figs. 2 and 4 are the same for the corresponding circuit components. In addition, the external reference characters in Fig. 4 which are identical with those in Fig. 2 are primed. As indicated in the timing circuit diagram of Fig. 5, the plot 60 showing the control for the gating circuit 58 allows a time interval $d$ for the full energization of the flip-flop 38'. The time between the sensing of flip-flop 38' during successive cycles is now $(\tau+t+\Delta+d)$ seconds. It may be noted that if $(\tau+d)$ is equal to $(t+\Delta)$, a signal is applied to the adder for exactly half of the time. This suggests that the adder could be used more efficiently and that the speed of repeated additions could be increased.

Figure 6:
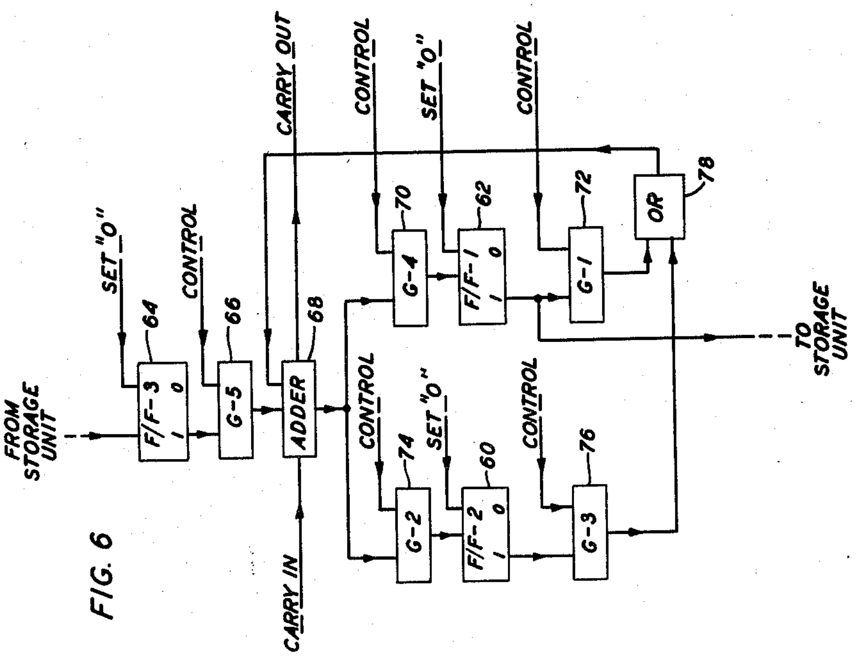
Fig. 6 is a logic circuit diagram of one stage of an adder circuit and the associated composite accumulator register stage in accordance with the invention.

Fig. 6 on Sheet 1 of the drawings shows one stage of an arithmetic unit in accordance with the invention in which two accumulator registers 60 and 62 are employed. While one register is being used, the other register is being reset to the "0" state preparatory to receiving the next successive digit. This arrangement permits full utilization of adder time and therefore doubles the speed of operation of the arithmetic unit in performing certain repetitive operations, as explained in detail below.

The circuit of Fig. 6 includes the flip-flop 64, the gate 66, and the adder stage 68, which correspond to the circuits 40, 42, and 36, respectively, in Fig. 2. The two gating circuits 70 and 72 are associated with the flip-flop 62 which is one of the two parallel accumulator bit registers. Similarly, the gating circuits 74 and 76 are associated with the flip-flop 60 which is part of the other accumulator register. The outputs from the two flip-flops 60 and 62 are combined in the OR unit 78 for transmission to one input of the adder 68.

In considering the operation of the circuit of Fig. 6, the case where the digit stored in flip-flop 64 is added repeatedly to the digit stored in the accumulator will be considered. Initially, the digits in registers 62 and 64 are added. This operation begins by enabling the gating circuits 66 and 72 simultaneously. As soon as the sum is available at the output of added 68, gate 74 is enabled and the sum is stored in flip-flop 60. Then gating circuits 76 and 66 are enabled simultaneously and thereafter the second sum is routed to flip-flop 62 by the enabling of gate 70. Each of flip-flops 60 and 62 is reset while the other flip-flop is being sensed. Thus, the first, third, and all the odd sums are stored in register 60, while all even sums are stored in register 62.

Figure 7:
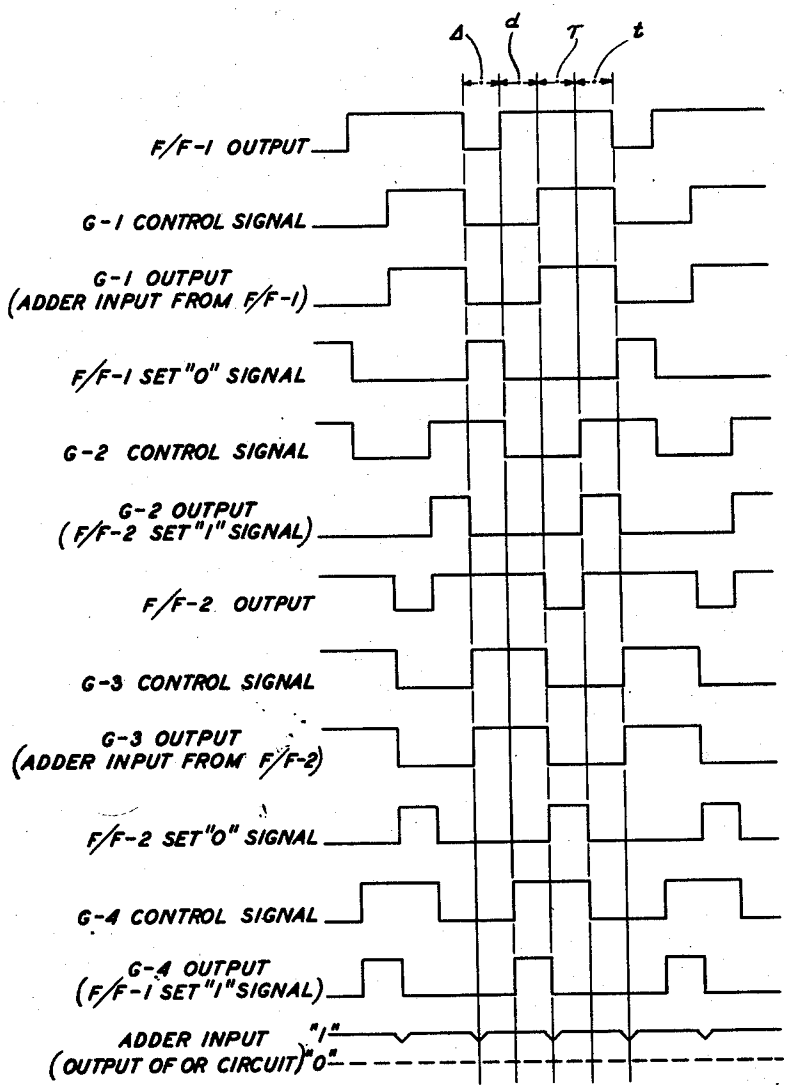
Fig. 7 is a diagram of the wave forms present at various points in the circuit of Fig. 6.

The wave forms for the circuit of Fig. 6 are shown in Fig. 7. As shown in Fig. 7, the time periods $t$, $\Delta$, $d$, and $\tau$ are all equal. In addition, for the purpose of simplifying the wave forms, the digit stored in register 64 and the previous carry digit are assumed to be "0." Staggered gating signals which last for one half of an adder cycle are required with each gating signal starting at successive periods equal to one quarter of a full adder cycle. It may be noted that the adder is used efficiently, with the outputs of the two accumulator flip-flops 60 and 62 being applied alternately to the adder input.

Referring to Fig. 7, it may be noted that the final plot represents the output from the OR circuit 78 of Fig. 6. The notches in the wave form of this plot indicate the transitions between the output pulses from the registers 60 and 62 of Fig. 6. This wave form appears when an inital "1" is stored in the register 62 and when no carries or additional 1's from register 64 appear during the next successive addition cycle.

In view of the nature of the wave form at the output from the OR circuit 78, direct current coupled circuits are employed between the OR circuit and the adder 68. The adder stage 68 of Fig. 6 may be any suitable adder which is capable of responding to direct current levels rather than pulses. It would be desirable that the adder circuit employed in the present invention be a high speed adder such as that described in J. H. Felker Patent 2,885,572, issued May 5, 1959, modified to respond to direct current levels as noted above. Concerning the gates, or AND circuits, and the OR circuits employed in the present circuitry, it is desirable that they be the normal diode logic circuits such as those shown in J. H. Felker, Patent 2,758,787, granted August 14, 1956. It is also contemplated that linear transistor amplifiers are employed to maintain appropriate signal levels. Any suitable junction transistors may be employed in the flip-flop or bistable circuits which are used extensively in the present circuitry. A typical circuit which may be employed is disclosed in Fig. 12–60 (*a*) on page 494 of a book entittled "Transistor Electronics" by A. W. Lo et al., Prentice-Hall, Inc., 1955.

In the foregoing description, the circuitry included in one stage of the A-register 20, the adder 22, and the accumulator register 24 has been considered. Figs. 8A and 8B and 9A and 9B, which show how the high speed circuit of Fig. 6 is incorporated into the balance of the arithmetic unit circuitry, will be considered shortly. Before discussing the details of these circuits, however, the over-all mode of operation of the arithmetic unit of Fig. 1 will be mentioned briefly, and the relationship of the circuits of Figs. 8A and 8B, and 9A and 9B, with the block diagram of Fig. 1 will also be noted.

Figure 8A:
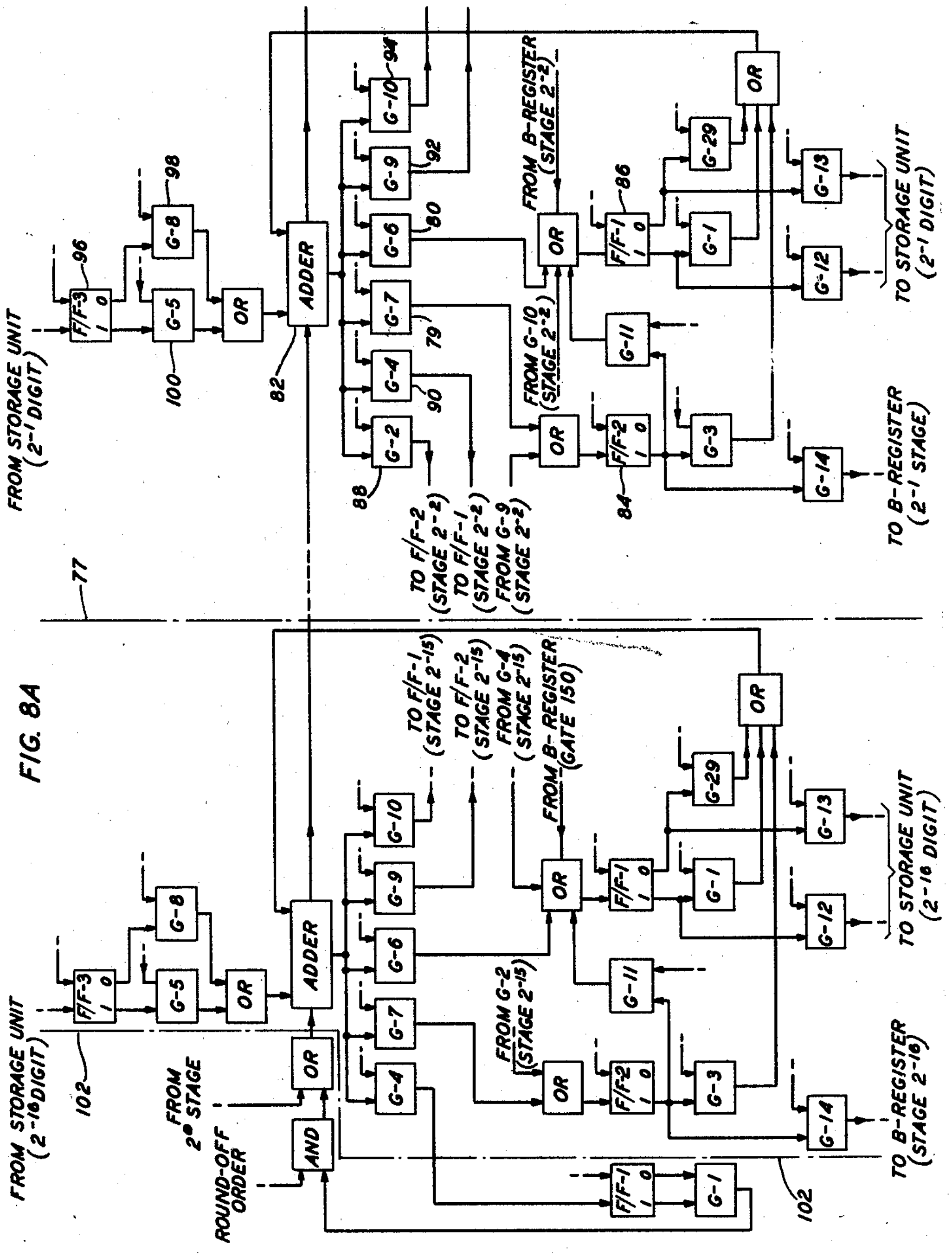
Figs. 8A and 8B show a detailed logic circuit diagram of the accumulator register, the adder, and an input register shown in the block diagram of Fig. 1.
Figure 8B:
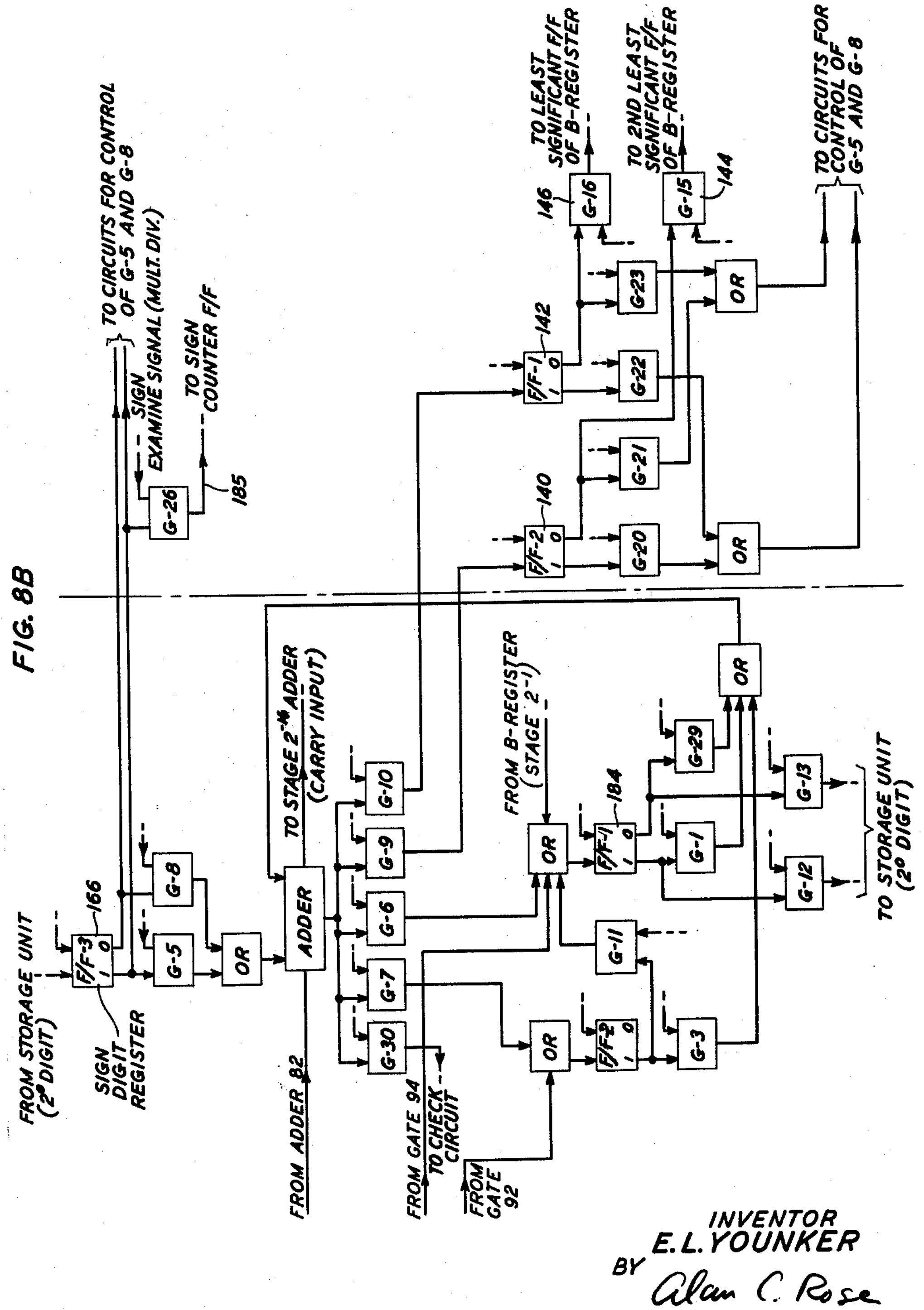
Figure 9A:
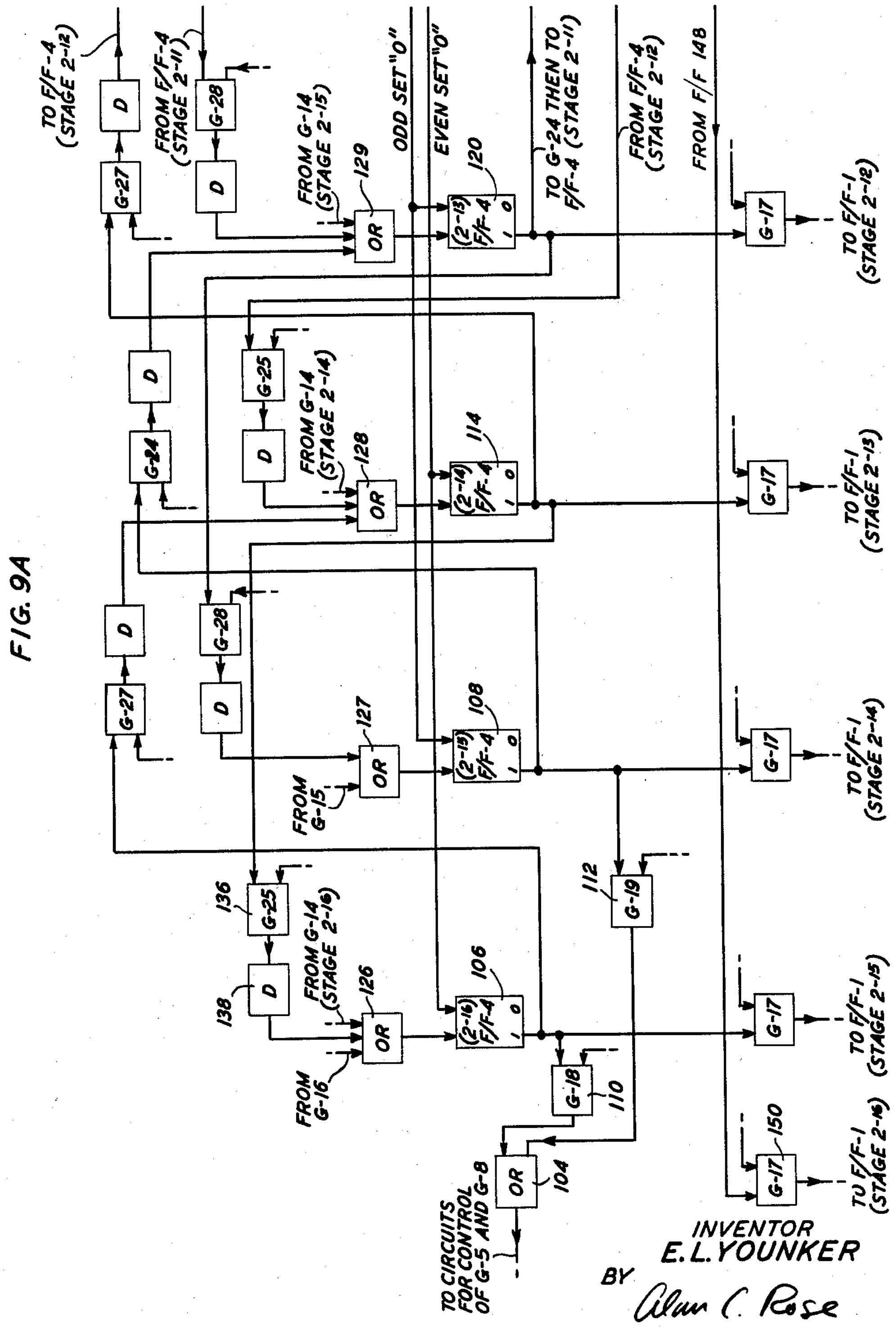
Figs. 9A and 9B show a detailed logic circuit diagram of the interlaced shift register in accordance with the invention which is shown as the B-register in Fig. 1.
Figure 9B:
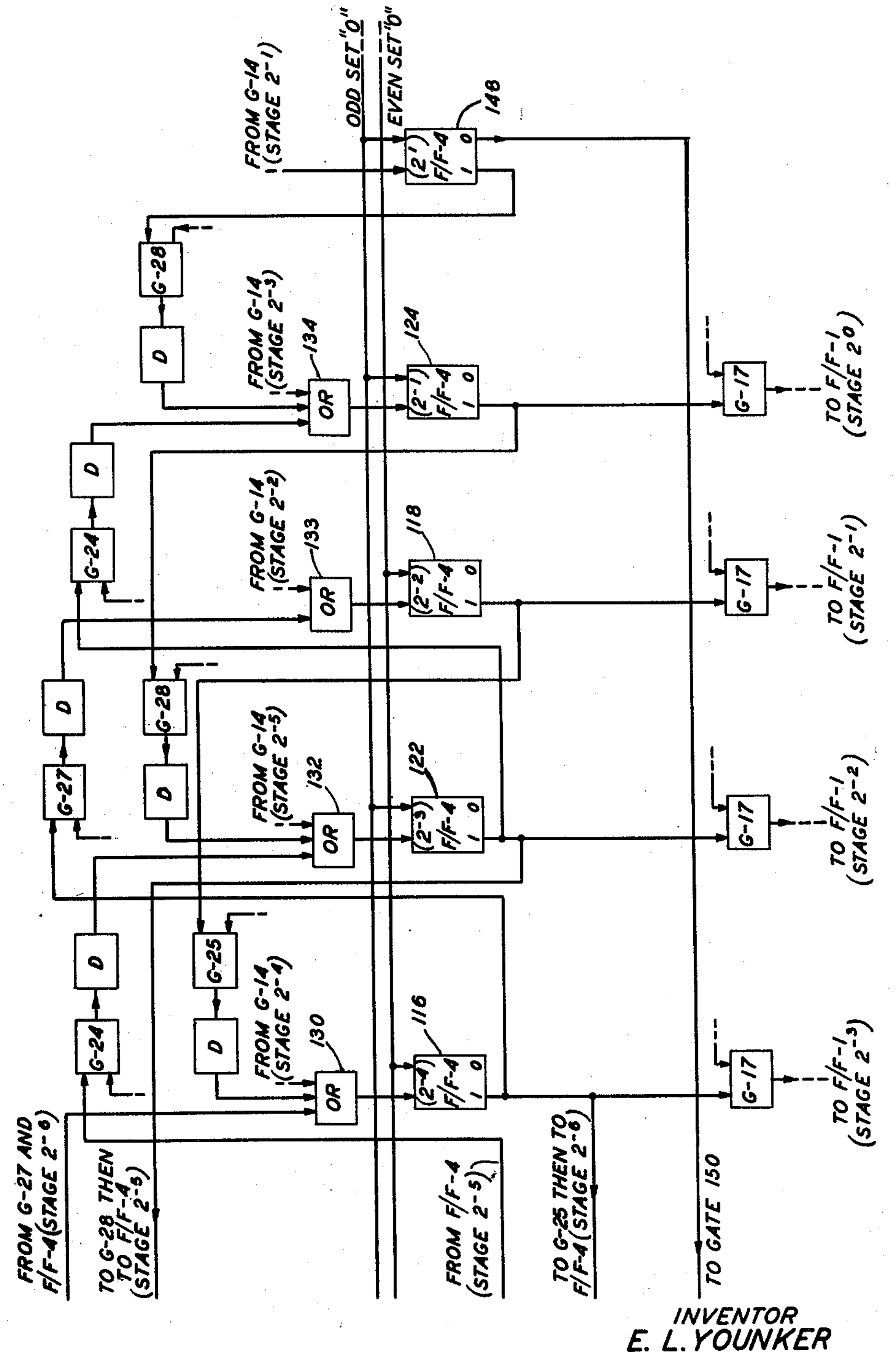

Figs. 8A and 8B constitute a detailed logic circuit diagram of several stages of the A-register 20, the adder 22, and the accumulator register 24 of Fig. 1. Figs. 9A and 9B together show a logic circuit diagram of a number of stages of the B-register 26 of Fig. 1. In Figs. 8A, 8B, 9A, and 9B, the circuitry required for interconnecting the various components is also disclosed.

In the present arithmetic unit, addition operations are accomplished by a simple operation in which the number stored in the accumulator register is added to that stored in the A-register. Referring to Fig. 8A, one stage of the circuits indicated by the blocks 20, 22, and 24 is shown between the vertical dash-dot line 77, and the right-hand side of Fig. 8A. It may be noted that this circuit corresponds generally to the circuit of Fig. 6, but includes certain extra control circuitry. In the block diagram of Fig. 1, it was noted that the three pairs of double lines 28, 30, and 32 indicated that in transferring information from the adder 22 to the accumulator register 24, numbers could be shifted to the left or right, or transferred "straight down." In addition or subtraction operations, no shift is necessary. Accordingly, referring to Fig. 8A, the gating circuits 79 and 80 are employed in addition operations to transfer information from the adder stage 82 to the flip-flops 84 and 86, forming part of the accumulator register. Incidentally, it may be noted that the gating circuits 88 and 90 are employed in shifting partial products to the left-hand, or less significant direction. Similarly, the gating circuits 92 and 94 are employed to shift the partial remainder to the right-hand, or more significant direction during the division operation.

Before considering subtraction operations in the computer in detail, the basic definitions of the terms employed in the subtraction process should be mentioned. More specifically, in performing subtraction operations it may be recalled that a subtrahend is subtracted from a minuend to produce a difference. Now, in subtraction operations in the present arithmetic unit the minuend is initially inserted in the accumulator register, including flip-flop 86 in Fig. 8A and the tubtrahend is placed in the A-register including flip-flop 96 in Fig. 8A. Subtraction operations are accomplished by adding the 1's complement of the subtrahend to the minuend. In the stage shown at the right-hand side of Fig. 8A, this is accomplished by transferring the subtrahend to the adder through the gating circuit 98 connected to the "0" output of the A-register flip-flop 96. This is in contrast to the use of gating circuit 100 for normal addition operations.

In the multiplication operation, a multiplicand is multiplied by a multiplier to produce a product. Referring to Fig. 1, the multiplier is initially stored in the B-register 26 and the multiplicand is initially stored in the A-register 20. Successive partial products, as well as the final product, appear in the accumulator register 24. Referring to the circuit of Fig. 8A, the multiplicand is stored in the A-register including flip-flop 96. Successive digits of the multiplier are applied from the B-register of Figs. 9A and 9B to control the gating circuits, including gating circuit 98 or 100, which interconnect the A-register and the adder. It has been noted above that the gating circuits G2 and G4 are employed in multiplication operations to shift signals in the less significant direction. In this regard, it may be noted that the present computer does not retain double length numbers. Thus, in Fig. 8A, the computer stage between the dash-dot lines 77 and 102 processes the least significant digits of the numbers under consideration. When a left shift is made from this stage, the least significant digit of the partial product is destroyed. One specific numerical example of a multiplication problem will be presented at a later point in this specification.

In division operations the technique which is employed is closely related to the method disclosed on pages 690 through 692 of an article entitled "Arithmetic Operations in a Binary Computer," by Robert F. Shaw, Review of Scientific Instruments, volume 21, Number 8, August 1950. The technique is the so-called "non-restoring" method of division. In the technique a pseudo-quotient is produced when the dividend is divided by the divisor, and this is transformed into the true quotient by a simple arithmetic operation. Referring to Fig. 1, the divisor is initially stored in the A-register 20 and the dividend is initially stored in the accumulator register 24. The pseudo-quotient is developed bit by bit and placed in the B-register 26. Subsequently, the pseudo-quotient is transformed into the true quotient as it is transferred back to the accumulator register 24.

The circuit of Figs. 9A and 9B is a shift register which is interconnected with the circuit of Figs. 8A and 8B. During various operations digital data are transferred from the circuit of Figs. 8A and 8B to the circuit of Figs. 9A and 9B and vice versa, both serially and in a parallel manner. As mentioned above, for multiplication purposes the multiplier is stored in the B-register 26 and the multiplicand is stored in the A-register 20. During successive cycles of a single multiplication operation, the multiplicand in the A-register is either added to the partial product stored in the accumulator register 24 or is not added to this partial product, depending on the successive digits of the multiplier which are shifted into the least significant digit place of the B-register during each of the successive cycles. Referring to Figs. 9A and 9B, the serial output signals from the B-register appear at the output of the OR circuit 104 at the left-hand edge of the circuit of Fig. 9A. The signals applied to the input of the OR unit 104 are derived from the two least significant flip-flops 106 and 108 of the register through the gating circuits 110 and 112, respectively. The shift register of Figs. 9A and 9B is a composite shift register, and the flip-flops 106 and 108 are associated respectively with the two interlaced shift registers which make up the composite shift register, as explained in greater detail hereinafter.

The numbers employed in the present computer include seventeen binary digits or bits. More specifically, they include sixteen digits and an extra bit to indicate the sign of the number. In accordance with the numbering system used in many fixed binary point computers, all of the binary digits or bits except the sign bit appear to the right of the binary point. It may be noted that this type of numbering system is often called a fractional numbering system, in view of the fact that all of the numbers have an absolute magnitude which is less than one. The individual digits and circuitry associated with the digits having a given significance are often designated by the number 2 and an exponent. Thus, for example, the least significant digit would be designated the $2^{-16}$ digit. Similarly, the digits of greater significance would be designated by the symbols $2^{-15}$, $2^{-14}$, et cetera, up to the most significant digit, which is the $2^{-1}$ digit.

Concerning techniques for handling signs in the present computing apparatus, it has been mentioned that the sign bit is the only bit which appears to the left of the binary point. Signs are considered directly in addition and subtraction operations, and the A-register and the accumulator register can both handle negative numbers. To avoid certain complications, however, the operands in multiplication and division operations are always considered to be positive numbers, and the actual sign is registered in a sign counter. In view of the fact that negative numbers are not used directly in multiplication or division operations, negative numbers never appear in the B-register. The true signs of quotients or products are restored when these results are returned to storage or employed in addition or subtraction operations. The detailed circuitry for handling the signs will be covered at a later point in this description.

Referring again to the shift register of Figs. 9A and 9B, the composite shift register is made up of two shift registers in which the odd and even digits in the register are processed. The flip-flop 106 is the bit register for the least significant digit in the even shift register. The other bit registers in the even shift register include the flip-flop 114 in which the $2^{-14}$ digit is stored, the flip-flop 116 in which the $2^{-4}$ digit is stored, and the flip-flop 118 in which the $2^{-2}$ digit is stored. Other flip-flops in the even portion of the composite storage register of Figs. 9A and 9B have been omitted in view of the fact that they are substantial duplicates of the register which are shown in this figure. The odd bit registers which are shown in Figs. 9A and 9B include the bit register 108 for the least significant odd digit, and the flip-flops 120, 122, and 124 for odd digits of progressively greater significance. Numbers may be transferred into or out of the shift register of Figs. 9A and 9B in parallel. When a number is applied to the shift register of Figs. 9A and 9B in parallel, the individual digits are applied to the bit registers by way of the OR units 126 through 134 for digits of progressively increasing significance. As indicated in the block diagram of Fig. 1 and by the legends on Figs. 9A and 9B, binary numbers can be transferred in a parallel manner into the shift register of Figs. 9A and 9B from the accumulator register 24. In transferring information in parallel from the composite shift register, the gating circuits designated G17 are employed. The function of these circuits will be mentioned in somewhat greater detail in the course of the description of the division operation.

In the consideration of the circuit of Fig. 6 and Fig. 8, a technique for increasing the speed of successive additions was discussed. However, in order to process digits at the high repetition rates indicated in the foregoing discussion, it is necessary to supply input control information to the adder circuitry at a high rate of speed. Thus, with reference to Fig. 1, when multiplication operations are performed, the multiplicand is initially stored in the A-register 20, and successive digits of the multiplier stored in the B-register 26 must appear at a high rate of speed at the output of the B-register to control the operation of the adder.

In order to provide the output information from the shift register of Figs. 9A and 9B at the required high speeds, the interlaced odd and even shift registers mentioned above have been provided. In operation, the even bits are transferred from one even bit register to the next less significant even bit register. Thus, for example, during the time interval when an odd bit is being gated out of the flip-flop 108 through the gate circuit 112 and the OR circuit 104, the bits stored in the even register are being shifted. More specifically, the information stored in the even single bit register 114 is transferred through gate circuit 136, delay unit 138, and the OR unit 126 to the least significant even bit register 106. Simultaneously, all the other even bits are transferred to the next less significant even bit register. Later, when the least significant even bit is gated through the circuit 110 to the OR unit 104 to control the adder circuitry, a similar shifting operation occurs in the odd bit registers. In this manner, the time required for shifting digits from one bit register to the next less significant bit register, which would be required if output signals were gated only from a single bit register, is saved. The alternate gating of bits from the flip-flops 106 and 108 of the two interlaced shift registers permits the rapid application of control signals to the adder unit required to maintain its high speed of operation.

As mentioned above, the division algorithm employed in the present computer is a type of "non-restoring" device which is similar to that described in the Shaw article cited above. The specific rules for the steps to be taken in the present division operation are as follows:

(1) Start with the dividend as the remainder and zero as the partial quotient.

(2) If the sign of the remainder is the same as the sign of the divisor, subtract the divisor from the remainder and insert a "1" in the least significant place of the partial quotient. If the signs differ, add the divisor to the dividend and insert a "0" in the least significant place of the partial quotient.

(3) Note the sign of the remainder. Shift the binary point one place in the more significant direction in the remainder and in the partial quotient, dropping all bits beyond the sign bit.

(4) If the sign of the remainder before shifting is the same as the divisor, subtract the divisor from the remainder and insert a "1" in the least significant place in the partial quotient. If the signs differ, add the divisor to the remainder and insert a "0" in the partial quotient.

(5) Repeat steps 3 and 4 for a number of times equal to the number of digits (including the sign bit) in the binary numbers upon which the algorithm is being performed.

(6) Shift the binary point one place to the right in the partial quotient and negate the least significant bit to obtain the rounded true quotient.

An example of the foregoing method of division follows:

```
     0.10001111
     ----------=0.1011
       0.1101

     0.10001111  0.0001
 Sub 0.1101
     ----------
     1.10111111

 (1) 1.0111111   0.0010
 Add 0.1101
     ---------
 (1) 0.0100111

 (0) 0.100111    0.0101
 Sub 0.1101
     --------
     1.110011

 (1) 1.10011     0.1010
 Add 0.1101
     -------
     0.01101

[(0) 0.1101 ]    1.0101=Q
[Sub 0.1101 ]
[    ------ ]
[    0.0000 ]
             (1) 0.1010
                      1
                 ------
                 0.1011
```

The processes described above and illustrated by the foregoing example can readily be justified in the same manner as developed in the Shaw article for his division method. Using this technique, the following equation results:

$$\frac{x}{y}=2Q-2+\frac{1}{2^n}$$

where $x$ is the dividend, $y$ is the divisor, Q is the quotient, and $n$ is the power of the least significant digit.

The foregoing equation requires that the pseudo-quotient be multiplied by two. Since this produces a "0" in the least significant place, a "1" may be inserted or "stuffed" in this place instead of adding a "1." It is not necessary to subtract the number "2," as indicated in the foregoing equation, since the "2" in the equation is automatically rejected by the computer because it is outside the number range of the computer.

As mentioned above, the dividend is initially located in the accumulator register 24 and the divisor is initially placed in the A-register 20. The pseudo-quotient is developed bit by bit and placed in the B-register 26. The pseudo-quotient is shifted and converted to the true quotient as it is returned to the accumulator register 24. With reference to Figs. 8A and 8B, it will be recalled that the pair of gating circuits 92 and 94 are employed to shift the remainder in the more significant direction. The comparable gates G9 and G10 in each stage are employed to perform this function during the division operation. The successive bits of the pseudo-quotient are developed at the flip-flops 140 and 142, respectively, during alternate cycles of the adder circuitry. As indicated by the legends associated with the output of the gating circuits 144 and 146, successive bits of the partial quotient are routed to the least significant bit register in the odd and even shift registers of the circuit of Figs. 9A and 9B. Thus, the output from the gating circuit 146 is coupled to the OR circuit 126 at the input to flip-flop 106, which is part of the even shift register; and the output of the gating circuit 144 is coupled to the OR unit 127 at the input to flip-flop 108, which is the least significant bit register of the odd shift register of Figs. 9A and 9B. In the reception of pseudo-quotient bits, the composite shift register of Figs. 9A and 9B operates in much the same manner as in the transmission of serial digital signals in the multiplication process. Thus, for example, during the period when the even shift register portion is receiving input signals, the bits in the odd shift register are being shifted to the bit register representing the next more significant digit. Similarly, when the odd shift register is receiving input signals, the even bits are shifted.

Following the completion of the repetitive portion of the division operation, the pseudo-quotient is stored in the composite shift register of Figs. 9A and 9B. To transform the pseudo-quotient into the true quotient, as indicated by step 6 above, it is necessary to shift the binary point one place to the right and to "stuff" a "1" in the least significant bit place. This operation is performed by the circuit connections as indicated in Figs. 8A, 8B, 9A, and 9B, which were provided for transferring information in parallel from the composite shift register of Figs. 9A and 9B to the accumulator register of Figs. 8A and 8B. Thus, for example, it may be noted that the legends associated with the output of each gating circuit G17 in Figs. 9A and 9B indicate that the signal is to be coupled from a bit register in the shift register of Figs. 9A and 9B to the next more significant bit register of the accumulator register. Thus, for example, the output from flip-flop 108, in which the $2^{-15}$ digit is stored, is connected to the stage of the accumulator register representing the $2^{-14}$ digit. The circuitry through which a "1" is "stuffed" into the least significant bit place to the true quotient circuitry includes the flip-flop 148 and the gating circuit 150. The flip-flop 148 is set to the "0" state during this portion of the computer cycle, and the gating circuit 150 is connected to the "0" output terminal of this flip-flop. Accordingly, the signal transmitted by gating circuit 150 to the least significant stage of the accumulator register will be the required "1."

Figure 10:
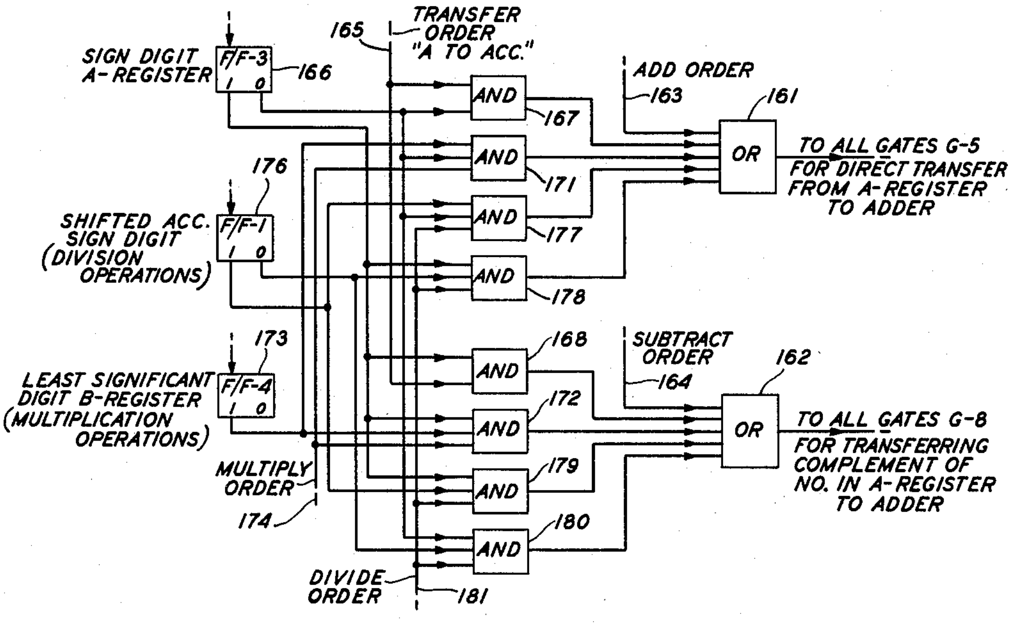
Fig. 10 is a logic circuit diagram of the gating circuit for controlling the transfer of information between the A-register and the adder shown in Fig. 1.

Fig. 10 represents the control circuit for the transfer of numbers between the A-register 20 and the adder 22 of Fig. 1. Referring to Figs. 8A and 8B, the digits in the A-register are stored in the flip-flop designated F/F–3. When it is desired to transfer the number stored in the A-register to the adder directly, the gates designated G5 are employed. However, when it is desired to transfer the complement of the number stored in the A-register to the adder, the gates G8 are employed. In Fig. 10 a pulse from the OR circuit 161 applies a signal to all of the gates designated G5, and an output pulse from the OR circuit 162 energizes all of the gates designated G8.

Considering the simplest orders first, a simple add order on lead 163 produces an output pulse from the OR unit 161. Similarly, a subtract order on lead 164 produces an output pulse from the OR unit 162 and gates the complement of the number stored in the A-register to the adder. In the present system, the addition of the complement of a number produces the same result as subtracting the number in its original form.

The next operation to be considered is the transfer order "A to ACC." which is applied to lead 165 in Fig. 10, and is the order for transferring the absolute value of a number in the A-register to the accumulator register. If the sign of the number in the A-register is positive, it is transferred directly to the accumulator register; if it is a negative number, it is complemented in the transfer operation. In Fig. 10 this operation is implemented by the flip-flop 166 in which the sign digit of the number in the A-register is stored, and by the AND circuits 167 and 168. Incidentally, it may be noted that the flip-flop 166 also appears at the upper left of Fig. 8B. When the flip-flop 166 is set to the "0" state, indicating a positive number, the energization of the transfer order lead 165 gates a pulse through the AND unit 167 to the output of the OR circuit 161. Similarly, when the flip-flop 166 is in the "1" state, indicating a negative number, a pulse is gated through the AND circuit 168 and the OR circuit 162.

The AND units 171 and 172 and the flip-flop 173 are employed in the multiplication operation. The AND unit 171 has an inputs leads from the "1" state of the flip-flop 173, the multiplication order bus 174, and the "0" state of the flip-flop 166. In order to produce an output pulse, therefore, the less significant digit in the B-register must be a "1," the number stored in the A-register must have a positive sign and a multiplication order must be present. The least significant digit in the B-register has the significance of being the digit of the multiplier which is employed during a particular time interval. The flip-flop 173 in Fig. 10 actually represents either the flip-flop 106 or 108 in Fig. 9A. When the sign of the multiplier stored in the A-register is negative as indicated by the energization of the "1" state of the flip-flop 166, the AND circuit 172 is energized when the collateral conditions of the presence of a "1" at the least significant digit in the B-register and the presence of a multiplication order are also fulfilled. The simultaneous occurrence of these three input signals produces a pulse at the output of AND unit 172 and OR circuit 162.

Division operations are controlled by the flip-flops 166, 176, and the four AND units 177 through 180. One of the inputs to each of the AND circuits 177 through 180 is the division bus 181. The flip-flop 176 indicates schematically the state of the flip-flop 140 or 142 which appear in Fig. 8B. This corresponds to the sign of the remainder in division operations. The application of the divisor or its complement to the adder in division operations depends on the sign of the remainder, and the state of the sign counter 166, which indicates the sign of the quotient. If the signs are alike, the complement of the divisor is transferred to the adder; however, if the signs are unlike, the divisor is transferred directly to the adder. It may readily be seen from the connections to the AND units 177 through 180 that the foregoing functions are in fact accomplished.

Figure 11:
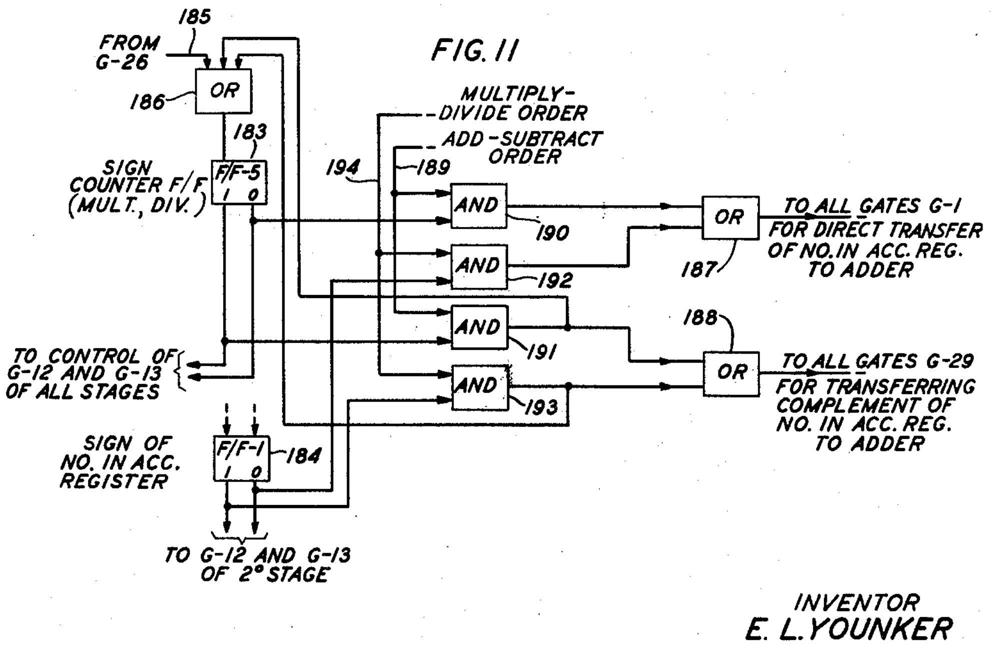
Fig. 11 is a detailed logic circuit diagram of a control circuit for the accumulator register and the adder.

The circuit of Fig. 11 is employed to control the gating of the number in the accumulator register 24 in Fig. 1 to the adder 22. Referring to Fig. 8A, it may be observed that the gates G1 and G29 are employed to transfer the actual number stored in the accumulator register or its complement, respectively, to the adder. The energization of the gates G1 or G29 depends on the state of the sign counter 183 and the sign of the number in the accumulator register as indicated by flip-flop 184. The sign counter 183 may be a flip-flop with a steering circuit so that successive input pulses change the state of the counter. Such a circuit is shown, for example, in J. G. Linvill and R. L. Wallace, Jr., Patent 2,880,330, issued March 31, 1959. Tying the circuit of Fig. 11 in with Fig. 8B, it may be noted that the output lead 185 from G26 in Fig. 8B is one of the inputs to the OR unit 186 at the input of the sign counter flip-flop 183. The sign counter flip-flop counts the negative signs of the operands in multiplication and division operations. Thus, if both of the numbers which are to be multiplied have the same sign, either positive or negative, the sign counter flip-flop will be in the "0" state. However, if either of the operands in a multiplication or division operation is negative, the flip-flop 183 will be in the "1" state. The flip-flop 184, indicating the sign of the number in the accumulator, is also shown in the logic circuitry of Fig. 8B.

An output signal from the OR unit 187 indicates that the number in the accumulator register is to be transferred directly to the adder input. A pulse at the output of the OR unit 188, however, indicates that the number in the accumulator is to be complemented in the course of the transfer to the adder circuit. If a number in the accumulator is to be added to another number, the true sign of the number is examined by reference to the sign counter flip-flop 183. For example, if this number is a product or a quotient having a true negative value, the sign counter flip-flop 183 will be in the "1" state. Thus, if the sign counter is in the "1" state when an "add-subtract" order is applied to lead 189, the AND unit 191 is energized to produce an output pulse which is transmitted through the OR unit 188 to provide a complementing transfer. In addition, the sign counter flip-flop is pulsed back to the "0" state. However, if the sign counter is initally in the "0" state when an add-subtract order occurs, the AND unit 190 is energized to produce an output pulse from the OR circuit 187. This produces the desired direct transfer of the number in the accumulator register to the adder.

The AND circuits 192 and 193 are provided for the circumstances when addition or subtraction operations are completed and it is desired to perform a multiplication or division operation with the number stored in the accumulator. For example, if the number stored in the accumulator is a negative number, it is necessary to place its complement in the accumulator register and step the sign counter to the "1" state. Under these circumstances, the flip-flop 184 would be in the "1" state, and a pulse appears at the output of AND unit 193 upon the occurrence of a "multiply-divide" order. The output of the AND unit 193 is coupled both to the input of the sign counter 183, via the OR unit 186, and also to the OR unit 188 to provide the desired complementary transfer. If the flip-flop 184 is set to the "0" state, indicating a positive number, the AND unit 192 is energized to produce a direct transfer to the adder.

Now that a suitable background has been established, a specific example of multiplication will be considered. As mentioned above, the fractional binary numbering system is employed in the present computer. In the specific multiplication problem which will be considered, the number 0.111 will be the multiplicand, and the number 0.101 will be the multiplier. The initial "0's" indicate that both numbers are positive. In view of the explanation of the operation of the sign control circuitry set forth above, these "0's" will be disregarded in the following explanation.

As a first step, the multiplication will be carried out in full in the usual grammar school manner:

| | |
|---|---|
| .111 | multiplicand |
| .101 | multiplier |
| 111 | |
| 000 | |
| 111 | |
| .100011 | product |

In the present apparatus, the multiplicand is stored in the flip-flops which are designated F/F–3 in Figs. 8A and 8B. More specifically, the three "1's" of the multiplicand will be stored in the flip-flops designated F/F–3 associated with the $2^{-1}$, the $2^{-2}$, and the $2^{-3}$ digital stages of the arithmetic unit. In this regard, it may be noted that the flip-flop 96 associated with the $2^{-1}$ digit is shown in Fig. 8A, but the two flip-flops associated with the $2^{-2}$ and the $2^{-3}$ stages are not shown. In addition, the sign bit "0" associated with the multiplicand is stored in flip-flop 166 shown in Fig. 8B. The multiplier digits are stored in the shift register shown in Figs. 9A and 9B. It is understood that the multiplicand and multiplier both include sixteen bits, and that the twelve least significant digits are all "0's." The successive output signals from the shift register of Figs. 9A and 9B are applied through the OR circuit 104 at the left-hand side of Fig. 9A to the gate circuits G5 and G8 of Figs. 8A and 8B.

The multiplication problem set forth above will now be repeated in a form which more closely resembles the action which takes place in the arithmetic unit of Figs. 8A and 8B:

| | | |
|---|---|---|
| .111 | (*a*) | multiplicand |
| .101 | (*b*) | multiplier |
| .111 | (*c*) | first partial product |
| .0111 | (*d*) | shift and store (F/F–1) |
| .000 | (*e*) | |
| .0111 | (*f*) | second partial product |
| .00111 | (*g*) | shift and store (F/F–2) |
| .111 | (*h*) | |
| 1.00011 | (*i*) | product (unshifted) |
| .100011 | (*j*) | shift and store (F/F–1) |

In the example set forth above, the multiplicand shown at (*a*) is stored in the flip-flops designated F/F–3, as mentioned above. When the first "1" digit of the multiplier is applied to gate circuit 100 and the other gates G5 of Fig. 8A, the multiplicand is applied to the adder 82 and the other adder stages of Fig. 8A. The output of the adder stages is shown in step (*c*) of the example set forth above.

In the arithmetic unit of Fig. 8A, it may be noted that the less significant digits are handled by stages which are to the left in Fig. 8A, and that the more significant digits are handled by stages which are to the right. This is, of course, contrary to the normal manner of writing numbers in which the most significant digits appear to the left. In step (*d*) set forth above, it may be noted that the first partial product is shifted in the less significant direction by one digit position. In the circuit of Fig. 8A, the gates G4 are enabled and the partial product from the adder circuits is shifted to flip-flops designated F/F–1 in the next stage in the left-hand or less significant direction.

Step (*e*) in the example set forth above indicates that the second digit of the multiplier is a "0." The second partial product at the output of the adder circuits is therefore shown in step (*f*) as the number .0111. Following another shift in the left-hand direction in Fig. 8A, through the gates G2, the second partial product is shown in step (*g*) stored in the set of flip-flops designated F/F–2. In step (*h*), the third digit of the multiplier gates the multiplicand through the adder circuits and the product appears in step (*i*). Following the shifting operation through the gates G4, the final product as shown at step (*j*) is stored in the flip-flops designated F/F–1. This answer is seen to check the previous product obtained by normal multiplication techniques.

In the foregoing example, a pair of three digit numbers was employed. It is to be understood, however, that full sixteen digit numbers are normally utilized, both as the multiplier and as the multiplicand. As discussed previously in connection with Fig. 6, considerable increase in the speed of operation of the arithmetic unit is obtained by employing the set of flip-flops designated F/F–1 alternately with the flip-flops F/F–2. Furthermore, the interlaced shift register arrangement of Figs. 9A and 9B provides gating signals at the necessary high speed required for proper operation of the arithmetic unit of Figs. 8A and 8B.

It is to be understood that the above-described arrangements are illustrative of the application of the principles of the invention. Numerous other arrangements may be devised by those skilled in the art without departing from the spirit and scope of the invention.

What is claimed is:

1. In an electronic switching circuit wherein a binary variable is represented by an electrical signal and the variable negated is represented by the absence of a signal, switching means having a plurality of input leads for producing different output signals dependent upon the combinational nature of the input signals upon said input leads, said switching means having first and second output leads, a bistable device coupled to each of said first and second output leads, means for resetting each of said devices, means for alternately gating said first and second output leads, whereby when one of said leads is gated the device coupled to the other of said leads is reset, and means coupled to said bistable devices for controlling the appearance of signals on at least one of said input leads of said switching means.

2. In a parallel arithmetic unit for multiplying two binary numbers, a parallel adder, a first accumulator register coupled between the parallel output leads and one set of parallel input leads of said parallel adder, a second accumulator register coupled between said parallel output leads and said one set of parallel input leads of said parallel adder, and means for gating the successive output signals from said adder alternately to said first and second accumulator registers.

3. In an electronic switching circuit wherein a binary variable is represented by an electrical signal and the variable negated is represented by the absence of a signal, switching means having a plurality of input leads for producing different output signals dependent upon the combinational nature of the input signals upon said input leads, said switching means having at least one output lead, first and second bistable devices coupled to said output lead, means for alternately gating output signals from said switching means to said first and second bistable devices during successive time intervals, means for resetting each of said bistable devices during the time interval when said output signal is gated to the other of said devices, and means coupled to said bistable devices for controlling the appearance of signals on at least one of said input leads of said switching means.

4. In an electronic switching circuit wherein a binary variable is represented by an electrical signal and the variable negated is represented by the absence of a signal, switching means having a plurality of input leads for producing different output signals dependent upon the combinational nature of the input signals upon said input leads, said switching means having at least one output lead, first and second bistable devices coupled to said output lead, means for alternately gating output signals from said switching means to said first and second bistable devices during successive time intervals, means for resetting each of said bistable devices during the time interval when said output signal is gated to the other of said devices, individual gating circuits coupled to the output of each of said bistable devices, and circuit means for coupling the output from each of said two gating circuits to a single input circuit of said switching means.

5. In combination, a high speed data processing circuit, means for applying digital signals to said data processing circuit in parallel, first and second bistable devices connected to the output of said data processing circuit, an OR circuit connected to the output of both of said bistable circuits, means for alternately gating signals from said first and second bistable circuits, and means for resetting the second of said bistable circuits during the interval when signals are being gated from said first bistable circuit.

6. A circuit combination as defined in claim 5 wherein means are also provided for gating signal information from said data processing circuit in parallel.

7. A circuit combination as defined in claim 5 wherein said data processing circuit includes a plurality of substantially identical stages corresponding to binary digits of progressively increasing significance, and wherein said means for applying digital information to said data processing circuit in parallel includes a lead connected to each of said stages.

8. In a circuit for performing a division operation, a high speed composite shift register, said composite register including a plurality of odd single bit registers and a plurality of even single bit registers interleaved with said odd registers, a binary data processing circuit including an arithmetic unit and an accumulator register, means for transferring successive digital signals developed by said arithmetic unit alternately to the least significant odd bit register and the least significant even bit register of said composite register, means for shifting binary information from each odd single bit register to the odd bit register for the next more significant odd digit during the transfer of information from said data processing circuit to said even bit register, and means for shifting binary information from each even single bit register to the even bit register for the next more significant even digit during the transfer of information from said data processing circuit to said odd bit register.

9. In a circuit for performing a division operation, a high speed composite shift register, said composite register including a plurality of odd single bit registers and a plurality of even single bit registers interleaved with said odd registers, a binary data processing circuit including an arithmetic unit and an accumulator register, means for transferring successive digital signals developed by said arithmetic unit alternately to the least significant odd bit register and the least significant even bit register of said composite register, means for shifting binary information from each odd single bit register to the odd bit register for the next more significant odd digit during the transfer of information from said data processing circuit to said even bit register, means for shifting binary information from each even single bit register to the even bit register for the next more significant even digit during the transfer of information from said data processing circuit to said odd bit register, and means for modifying the digital signals stored in the composite shift register, said last-mentioned means including parallel connections from each stage of said composite shift register to the next more significant stage of said accumulator register.

10. In combination, a high speed shift register including a plurality of odd single bit registers and a plurality of even single bit registers interleaved with said odd registers, means for providing a binary number having a number of digits equal to the total number of said single bit registers, means for applying the digits of said binary number to corresponding single bit registers, a binary data processing circuit, means for transferring digits alternately between said data processing circuit and one of said odd bit registers and between said data processing circuit and one of said even bit registers, means for shifting binary information from each odd single bit register to the odd bit register for the next successive odd digit during the transfer of information between said data processing circuit and said even bit register, and means for shifting binary information from each single bit register to the even bit register for the next successive even digit during the transfer of information between said data processing circuit and said odd bit register.

11. In a high speed shift register, a plurality of odd single bit registers, a plurality of even single bit registers interleaved with said odd registers, means for providing a binary number having a number of digits equal to the number of said single bit registers, means for applying the digits of said binary number to the corresponding single bit registers, means for gating binary information successively from the least significant odd and even single bit registers, means for shifting binary information from each odd single bit register directly to the next odd bit register of lesser significance during the gating of information from said least significant even single bit register, and means for shifting binary information from each even single bit register directly to the next even bit register of lesser significance during the gating of information from said least significant odd single bit register.

12. In a high speed shift register, a plurality of odd single bit registers, a plurality of even single bit registers interleaved with said odd registers, means for providing a binary number having a number of digits equal to the total number of said single bit registers, means for applying the digits of said binary number in parallel to the corresponding single bit registers, a binary data processing circuit, means for transferring digits alternately between said data processing circuit and an odd bit register and between said data processing circuit and an even bit register, means for shifting binary information from each odd bit single register directly to the next odd bit register of lesser significance during the transfer of information between said data processing circuit and said even bit register, means for shifting binary information from each even single bit register directly to the next even bit register of lesser significance during the transfer of information between said data processing circuit and said odd bit register, and means for gating signal information out of said odd and even single bit registers in parallel.

References Cited in the file of this patent

UNITED STATES PATENTS

| | | |
|---|---|---|
| 2,637,812 | Hagen | May 5, 1953 |
| 2,655,598 | Eckert et al. | Oct. 13, 1953 |
| 2,683,819 | Rey | July 13, 1954 |
| 2,700,501 | An Wang | June 25, 1955 |
| 2,719,670 | Jacobs et al. | Oct. 4, 1955 |
| 2,781,447 | Lester | Feb. 12, 1957 |